(12) United States Patent
Fasano et al.

(10) Patent No.: US 11,495,994 B2
(45) Date of Patent: Nov. 8, 2022

(54) UNIT AND SYSTEM FOR WIRELESS BALANCING FOR BATTERY CELL

(71) Applicant: Belenos Clean Power Holding AG, Biel/Bienne (CH)

(72) Inventors: Mariano Fasano, Cornol (CH); Antoine Toth, Delemont (CH)

(73) Assignee: Belenos Clean Power Holding AG, Biel/Bienne (CH)

( * ) Notice: Subject to any disclaimer, the term of this patent is extended or adjusted under 35 U.S.C. 154(b) by 607 days.

(21) Appl. No.: 16/441,090

(22) Filed: Jun. 14, 2019

(65) Prior Publication Data

US 2020/0036196 A1 Jan. 30, 2020

(30) Foreign Application Priority Data

Jul. 30, 2018 (EP) .................................... 18186368

(51) Int. Cl.
*H02J 50/10* (2016.01)
*H02J 7/00* (2006.01)
*H02J 7/02* (2016.01)

(52) U.S. Cl.
CPC ............ *H02J 50/10* (2016.02); *H02J 7/0014* (2013.01); *H02J 7/0021* (2013.01); *H02J 7/025* (2013.01)

(58) Field of Classification Search
CPC ........ H02J 7/0014; H02J 50/10; H02J 7/0016; H02J 50/80; Y02T 10/70; Y02T 90/16; B60L 58/22
USPC ......................................................... 320/118
See application file for complete search history.

(56) References Cited

U.S. PATENT DOCUMENTS

| | | | |
|---|---|---|---|
| 6,100,663 A | 8/2000 | Boys et al. | |
| 9,735,607 B2 | 8/2017 | Jeong et al. | |
| 2012/0068715 A1* | 3/2012 | Martaeng | G01R 31/382 324/434 |
| 2014/0055096 A1* | 2/2014 | Lee | H01M 10/482 320/134 |
| 2015/0188358 A1* | 7/2015 | Jeong | H02J 50/12 320/108 |
| 2015/0214757 A1 | 7/2015 | Zane et al. | |
| 2016/0336765 A1 | 11/2016 | Trimboli et al. | |
| 2016/0336767 A1 | 11/2016 | Zane et al. | |
| 2020/0021119 A1* | 1/2020 | Kim | H02J 7/0014 |
| 2020/0028369 A1* | 1/2020 | Lupo | H02J 7/0016 |
| 2020/0076013 A1* | 3/2020 | Sato | H04W 4/38 |

FOREIGN PATENT DOCUMENTS

KR 10-2015-0078428 A 7/2015
KR 20180087544 * 1/2017

OTHER PUBLICATIONS

Korean Office Action dated Sep. 10, 2020 in Patent Application No. 10-2019-0087900 (with English translation), 10 pages.
European Search Report dated Sep. 28, 2018 in European Application 18186368.9, filed on Jul. 30, 2018 (with English Translation of Categories of Cited Documents).

* cited by examiner

*Primary Examiner* — Jerry D Robbins
(74) *Attorney, Agent, or Firm* — Oblon, McClelland, Maier & Neustadt, L.L.P.

(57) ABSTRACT

A balancing unit is installed on a battery cell, and includes an element for measuring state parameters of the cell, a wireless communication element, making it possible to send and receive state parameters, and a wireless power transfer element.

13 Claims, 2 Drawing Sheets

UNIT AND SYSTEM FOR WIRELESS BALANCING FOR BATTERY CELL

This application claims priority to European Patent Application No. 18186368.9, filed Jul. 30, 2018, the entire contents of which are incorporated herein by reference.

FIELD OF THE INVENTION

The invention relates to the technical field of cell balancing systems comprising a battery.

BACKGROUND OF THE INVENTION

A battery is formed from a plurality of cells connected in series. These cells have as standard different characteristics in terms of production, temperature distribution or even life cycle, they often have different charge states which degrades the battery and reduces its operational efficiency. Thus, in order to optimise the capacities and lifespan of the battery, a BMS ("Battery Management System") is used as standard, an electronic system making it possible to control the charge states of the battery cells. Such an element ensures balancing of the charges of the cells by short-circuiting certain cells or by redistributing the power between the cells.

In FIG. 1 there is illustrated a plurality of cells C1-C3 arranged in series, each connected to a centralised BMS BMS_C by a wired link. The BMS therefore has access to state parameters of each cell, making it possible for it to decide if balancing is necessary, and to implement the balancing if necessary. This system has the disadvantage of requiring a large number of connection cables, which makes the system complex to install, heavy and voluminous, and makes the addition of new cells difficult, the BMS being able, in general, to handle only a predefined number of cells.

In order to limit these disadvantages, it is known to use a BMS with distributed topology, such as illustrated in FIG. 2 of the present application. In this case, each cell CX, X=1 . . . 3, is connected to a printed circuit board BMS_X (termed "BMS board"), and the boards are connected to each other and to a controller CTRL by a wired link.

Although the number of connection cables is reduced relative to a centralised topology, numerous wired connections remain necessary, which makes the installation and the maintenance of the system complicated. Moreover, even if the addition of supplementary cells is simplified, it remains tedious because it is necessary to disconnect and reconnect the boards from each other and also to adapt the controller as a function of the number of added cells, which makes necessary return of the balancing system to the factory.

Consequently, there is a need for a system for balancing cells forming a battery, which has better upgradeability and requires fewer wired connections than the systems of prior art.

SUMMARY OF THE INVENTION

The invention relates to a balancing unit installed on a battery cell, and comprising:
- means for measuring state parameters of the cell,
- means for wireless communication, making it possible to send and receive state parameters,
- means for wireless power transfer.

The invention relates equally to a system for balancing battery cells connected in series, comprising a plurality of balancing units, such as described above, each balancing unit being installed on a battery cell, the communication means of each balancing unit making it possible to send its state parameters to the adjacent balancing units and to receive the state parameters from the adjacent balancing units, the power transfer means making it possible to send power to the adjacent balancing units or to receive power coming from the adjacent balancing units.

The balancing unit can determine, as a function of its own state parameters and state parameters received from adjacent balancing units via the wireless communication means, if the cell is charged too much or too little relative to the adjacent cells. The power transfer means make it possible then to transfer a part of the power from the cell to one or to two adjacent cells or inversely to receive power from the adjacent cells.

It is noted that the power transfer is operable during charging, discharging and the inactive state of the cell, because the balancing unit is permanently supplied by the cell.

Furthermore, no cable is necessary between the various balancing units. Moreover, each balancing unit functions autonomously, there is therefore no need to connect them to a central unit is order to activate the balancing. All this limits the connections, the complexity of the system, its spatial requirement, its weight, etc.

Furthermore, the balancing system is entirely flexible: it suffices to place two balancing units one beside the other in order that a data communication or a power transfer is possible, which facilitates the addition or withdrawal of cells.

In one non-limiting embodiment, the communication means and the power transfer means are the same. This makes it possible to limit the number of components of the balancing unit, which has advantages in terms of complexity, spatial requirement, weight, cost and power expenditure.

Advantageously, these are inductive means, in particular formed from two coils disposed on both sides of the cell. Each coil makes it possible to communicate with one of the balancing units assigned to the adjacent cells. Advantageously, the coils are calibrated for optimal data communication and power transfers. The data communications and the inter-unit balancing power transfers are all the more optimal when the distances between the balancing units are small.

In one non-limiting embodiment, the state parameters of one cell comprise measurements of voltage and temperature of the cell and an operational status of the cell.

In one non-limiting embodiment, the state parameters comprise an operating duration of the cell.

In one non-limiting embodiment, the balancing unit comprises a memory comprising parameters for adjusting the cell and a history of events relating to the cell. The balancing unit has access to this memory in order to record and preserve the history of events. It is possible, via wireless data communication means, from a maintenance device external to the cell for example, to access the history of events of the cell and the installed control parameters.

Advantageously, the balancing unit takes into account the adjustment parameters and history of events in order to decide about transferring or receiving power.

In one non-limiting embodiment, the balancing system comprises a plurality of dissipative elements, each dissipative element being assigned to a cell and connected in parallel to said cell, and the balancing unit installed on said cell comprises means for controlling the dissipative element. The dissipative element is used at the end of charging the cell. The dissipative element makes it possible to dissipate a part of the power unnecessary for the cell, since the latter is integrally charged.

In a non-limiting embodiment, the state parameters comprise a measurement of the current in the dissipative element.

In one non-limiting embodiment, each dissipative element is formed by a metal oxide gate semiconductor field effect transistor (MOSFET), the drain and the source of which are branched on both sides of the associated cell, and the gate of which is connected to the associated balancing unit. However, the dissipative element might be any element which is capable of short-circuiting the cell (for example a resistance, a circuit breaker, a commutator, a bipolar transistor . . . ) when the latter is charged.

BRIEF DESCRIPTION OF THE DRAWINGS

Other features and advantages will emerge clearly from the description which is made hereafter, by way of example and in no way limiting, with reference to the annexed drawings, in which.

DETAILED DESCRIPTION OF AT LEAST ONE EMBODIMENT

Figure 3:
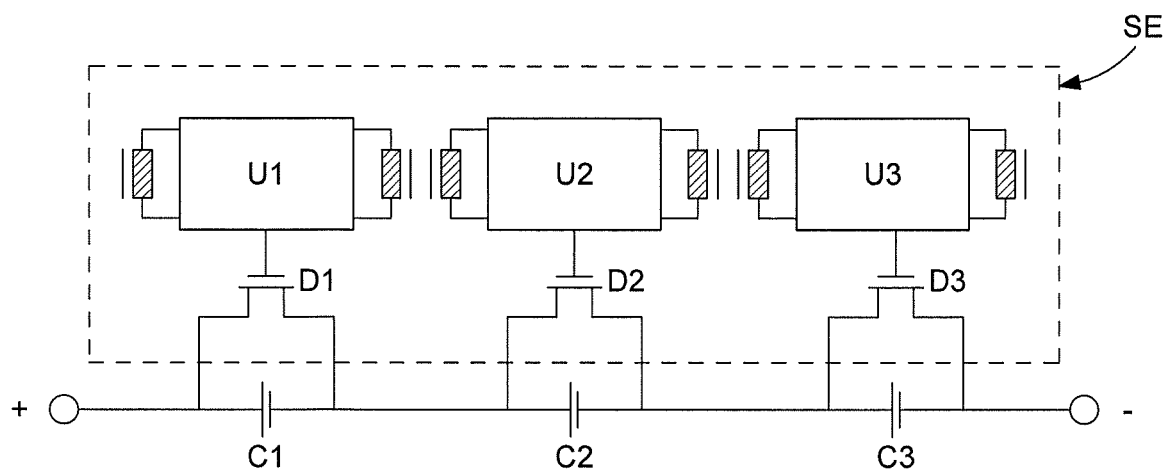
FIG. 3 represents a plurality of cells arranged in series, the balancing of which is ensured by a balancing system by wireless power transfer according to the invention.

FIG. 3 represents a battery comprising cells C1-C3 mounted in series and forming a battery, and a balancing system SE of said battery according to the invention. The balancing system comprises a plurality of dissipative elements D1-D3 and a plurality of balancing units U1-U3. There is connected to each cell a dissipative element and a balancing unit. It is noted that in the described example, the cells, the dissipative elements and the balancing units are each three in number but of course this number is not limiting.

Each dissipative element is composed of a MOSFET, the drain and the source of which are branched on both sides of the associated cell, and the gate of which is connected to the associated balancing unit. However, the dissipative element might be any element capable of short-circuiting the cell (for example a resistance, a circuit breaker, a commutator, a bipolar transistor . . . ) when the latter is charged.

Figure 4:
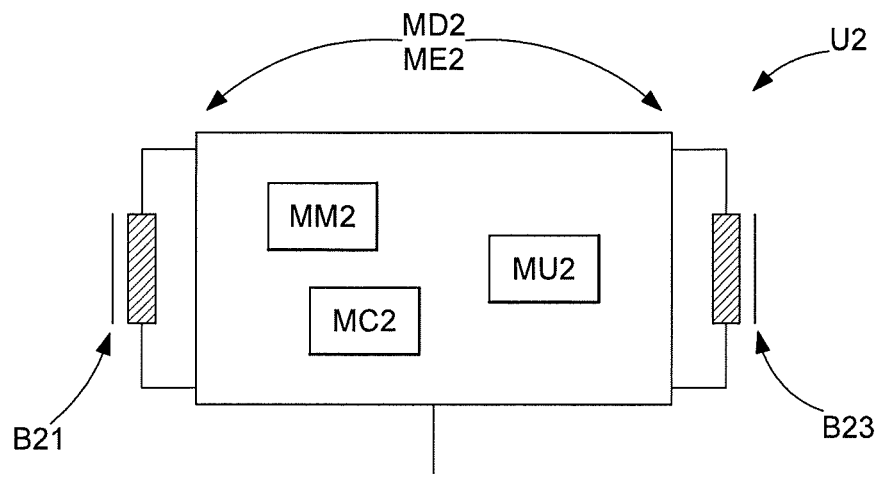
FIG. 4 represents a balancing unit of a balancing system by wireless power transfer according to the invention.

Each balancing unit functions autonomously during assignment to a cell. The balancing system according to the invention is completely decentralised. By way of example, FIG. 4 represents the balancing unit U2, it being understood that the other units are identical. The balancing unit U2 comprises:

means MC2 for controlling the associated dissipative element D2,
means MM2 for measuring state parameters of the associated cell C2,
means MD2 for wireless communication with the balancing units U1, U3 assigned to the adjacent cells C1, C3, making it possible in particular to send and to receive state parameters,
means ME2 for wireless power transfer with balancing units U1, U3 assigned to the adjacent cells C1, C3,
a memory MU2 comprising parameters for adjusting the cell C2 and a history of events relating to the cell.

The control means MC2 make it possible to control the associated dissipative element D2, by short-circuiting or not the associated cell C2.

The measuring means MM2 make it possible to measure state parameters which comprise in particular the voltage of the associated cell C2, the current passing through the dissipative element D2, and the temperature of the cell C2.

The communication means MD2 make it possible for the balancing unit U2 to send its state parameters to the balancing units U1, U3 of the adjacent cells C1, C3, and furthermore to receive their state parameters. The communication means MD2 are therefore bidirectional. The communication means MD2 likewise make it possible, in one embodiment, to receive or send status reports (indicating for example if a cell is in the process of balancing) and commands.

The power transfer means ME2 make it possible for the cell C2 to send to the adjacent cells C1, C3 power from the cell C2, or to receive the power coming from the adjacent cells C1, C3. The power transfer means ME2 are therefore bidirectional. The power transfer is wireless, and managed by the balancing unit. The state parameters transmitted between the cell C2 and the adjacent cells C1, C3 make it possible to adjust the quantity of power to be transmitted.

Figure 1:
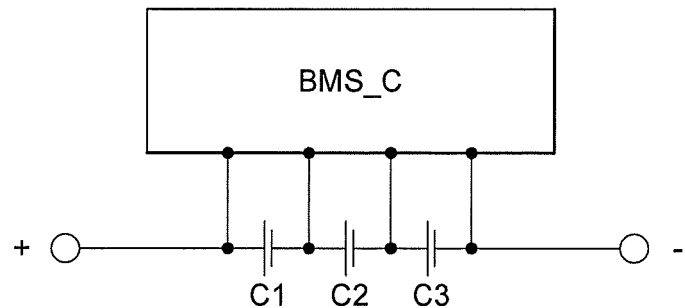
FIG. 1, already described, represents a plurality of cells arranged in series, the balancing of which is ensured by a centralised topology BMS, according to prior art, FIG. 2, already described, represents a plurality of cells arranged in series, the balancing of which is ensured by a distributed topology BMS, according to prior art.
Figure 2:
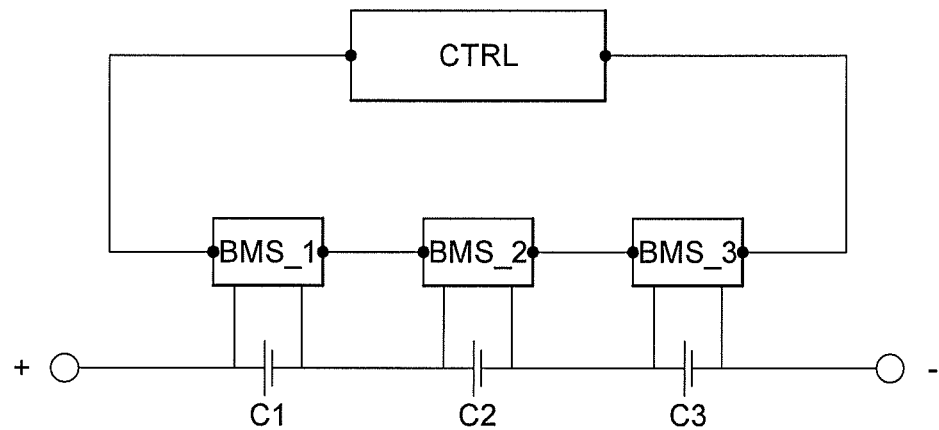

In the represented example, the communication means MD2 and power transfer means ME2 are of the inductive type and are formed from two coils B21, B23, one B21 of the two coils B21, B23 serving to communicate with one U1 of the two adjacent units U1, U3, the other B23 of the two coils B21, B23 serving to communicate with the other U3 of the two adjacent units U1, U3. Different frequencies are used for data communication and power transfer. It is noted that types of coupling other than inductive coupling between the balancing units are possible. The document "A review on the recent development of capacitive wireless power transfer technology" by Fei Lu, describes, in particular with reference to its FIG. 2, various types of possible couplings.

The memory MU2 comprises parameters for adjusting the cell C2. The adjustment parameters comprise factory parameters inherent to the production of the battery, for example its identification number, and parameters for the balancing, for example a minimum and maximum discharge and charge voltage or even a correspondence table of the state of charge as a function of the voltage of the cell. The memory MU2 likewise comprises a history of events undergone by the cell C2 during its lifespan, for example the duration of use of the cell, alerts, poor electrical handling of the cell, etc. The memory is a protected zone, it might be considered that it concerns a data safe. Only the balancing unit U2 itself and the manufacturer have access to the memory MU2 and can modify the data contained therein. The balancing unit U2 can, for example, be placed on a dedicated wireless support which makes it possible to access, via the communication means MD2, the memory MU2.

Figure 5:
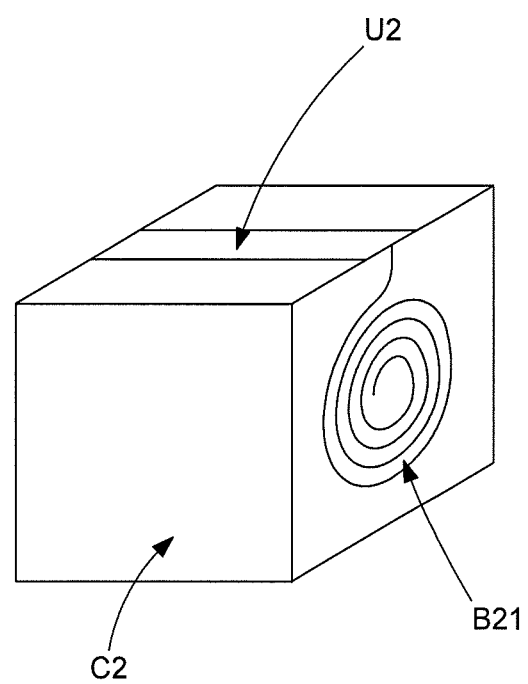
FIG. 5 represents a cell with an installed balancing unit according to the invention.

The assembly with cell C2, dissipative element D2 and balancing unit U2 form a compact assembly, as illustrated in FIG. 5. The balancing unit U2 is installed in the cell C2. FIG. 5 represents the cell C2, on both sides of which the two coils B21, B23 are placed, the two coils being connected to the balancing unit U2 mounted on a flexible printed circuit. This arrangement ensures a symmetry of structure which makes it possible to disregard the orientation of the assembly during its mounting or its replacement. Miniaturisation of the system makes it possible to minimise its impact in terms of volume and weight. The coils B21, B31 are positioned mechanically in order to guarantee an optimal power transfer yield.

The balancing system according to the invention has numerous advantageous, amongst others:
- it is flexible, i.e. it allows the addition of an undefined number of cells in series,
- it allows utilisation in active states (charge and discharge) and inactivity of the cell,
- it allows communication between adjacent cells for adaptation of the power levels and exchange of data,
- it allows, by linked wireless communication between all the cells in series, transfer of commands or information to several cells,
- it allows optimisation of power transfer by mechanical alignment of the cells of the battery,
- the distances between the cells being relatively short, the yield of the power transfer is improved,
- it allows remote access to each cell in order to know (and possibly to modify) its characteristics and information about parameters,
- it optimises communication between balancing cells, through the coupling, and
- it allows mechanical stability and positioning of the power transfer elements.

Of course the present invention is not limited to the illustrated example and is open to different variants and modifications which will be apparent to the person skilled in the art.

The invention claimed is:

1. A balancing apparatus installed on a battery cell in a balancing system in which a plurality of balancing apparatuses, each installed on a corresponding battery cell, are connected in series, the balancing apparatus comprising:
    means for measuring state parameters of the battery cell;
    wireless communication means for sending the measured state parameters to an adjacent balancing apparatus of the plurality of balancing apparatuses, and for receving state parameters from the adjacent balancing apparatus; and
    wireless power transfer means,
    wherein the balancing apparatus functions autonomously, and
    the balancing apparatus is configured to independently determine, based on the measured state parameters and the received state parameters to transfer power to an adjacent battery cell or to receive external power from the adjacent battery cell, and, based on the determination, cause the power transfer means to transfer the power from the battery cell to adjacent battery cell or receive power from adjacent cell.

2. The balancing apparatus according to claim 1, wherein the communication means and the power transfer means are the same.

3. The balancing apparatus according to claim 2, wherein the communication means and the power transfer means are each of an inductive type and formed by two coils that are disposed on respective sides of the battery cell and connected to the balancing apparatus, which is mounted on a flexible printed circuit.

4. The balancing apparatus according to claim 1, wherein the measured state parameters of the battery cell comprise measurements of voltage and temperature of the battery cell, and an operational status of the battery cell.

5. The balancing apparatus according to claim 1, wherein the measured state parameters of the battery cell comprise an operational duration of the battery cell.

6. The balancing unit according to claim 1, further comprising a memory storing parameters for adjusting the battery cell and a history of events relating to the battery cell.

7. The balancing apparatus of claim 6, wherein the balancing apparatus is further configured to determine to transfer the power or receive the external power based on the parameters for adjusting and the history of events stored in the memory.

8. The balancing system of battery cells connected in the series, the system comprising the plurality of balancing apparatuses, each being the balancing apparatus according to claim 1.

9. The balancing system according to claim 8, further comprising a plurality of dissipative elements, each dissipative element being assigned to a corresponding battery cell, and connected in parallel to the battery cell, and each balancing apparatus installed on the cell further comprises means for controlling the dissipative element.

10. The balancing system according to claim 9, wherein the measured state parameters of the battery cell comprise a measurement of the current in the dissipative element connected in parallel to the battery cell.

11. The balancing system according to claim 9, wherein each dissipative element is formed by a metal oxide gate field effect transistor, a drain and a source of which are branched on both sides of the battery cell, and a gate of which is connected to the balancing unit.

12. The balancing apparatus of claim 8, wherein each balancing apparatus in the plurality of balancing apparatuses is configured to independently and autonomously determine to transfer power or receive external power.

13. The balancing apparatus of claim 1, wherein the means for measuring state parameters is configured to measure the state parameters of only the battery cell on which the balancing apparatus is installed.

* * * * *